United States Patent
Ziech et al.

(10) Patent No.: US 7,188,850 B2
(45) Date of Patent: Mar. 13, 2007

(54) BEAM AXLE SUSPENSION WITH DIAGONAL LINK

(75) Inventors: James F. Ziech, Kalamazoo, MI (US); Michael L. Zebolsky, Marshall, MI (US)

(73) Assignee: Dana Corporation, Toledo, OH (US)

(*) Notice: Subject to any disclaimer, the term of this patent is extended or adjusted under 35 U.S.C. 154(b) by 300 days.

(21) Appl. No.: 10/813,713

(22) Filed: Mar. 31, 2004

(65) Prior Publication Data

US 2005/0218621 A1    Oct. 6, 2005

(51) Int. Cl.
*B62D 7/18* (2006.01)

(52) U.S. Cl. .................. 280/93.512; 280/124.125; 280/124.134

(58) Field of Classification Search ......... 280/124.125, 280/124.134, 124.13, 124.143, 93.512
See application file for complete search history.

(56) References Cited

U.S. PATENT DOCUMENTS

| | | | |
|---|---|---|---|
| 1,866,167 A | 7/1932 | Lolley | |
| 2,304,291 A | 12/1942 | Wahlberg | |
| 2,403,145 A | 7/1946 | Ulrich | |
| 2,756,067 A | 7/1956 | Porsche et al. | |
| 2,941,817 A | 6/1960 | Benson | |
| 3,512,802 A | 5/1970 | La Rock, Jr. | |
| 4,181,323 A | 1/1980 | Raidel | |
| 4,262,929 A | 4/1981 | Pierce | |
| 4,662,467 A | 5/1987 | Arai et al. | |
| 4,759,567 A | 7/1988 | Allen | |
| 4,802,690 A | 2/1989 | Raidel | |
| 4,951,962 A | 8/1990 | Tomida et al. | |
| 5,505,481 A | 4/1996 | VanDenberg et al. | |
| 5,507,510 A * | 4/1996 | Kami et al. ........... 280/124.136 |
| 5,651,561 A | 7/1997 | Tandy, Jr. et al. | |
| 5,865,452 A | 2/1999 | Chalin | |
| 6,073,946 A | 6/2000 | Richardson | |
| 6,129,369 A | 10/2000 | Dudding | |
| 6,135,470 A | 10/2000 | Dudding | |
| 6,182,984 B1 | 2/2001 | Chalin | |
| 6,293,570 B1 | 9/2001 | Gottschalk et al. | |

(Continued)

FOREIGN PATENT DOCUMENTS

EP    1 632 370 A1    3/2006

(Continued)

OTHER PUBLICATIONS

English language abstract of JP 10-181322.

(Continued)

*Primary Examiner*—Paul N. Dickson
*Assistant Examiner*—Tiffany L. Webb
(74) *Attorney, Agent, or Firm*—Dykema Gossett PLLC

(57) ABSTRACT

A steer axle and suspension assembly are provided that produce lateral stability in the vehicle without the use of a transverse rod and without generating undue loads on the steer axle beam. The assembly includes at least one suspension arm that is connected to the frame and to a component of the steer axle assembly such as the axle beam, kingpin, or steering knuckle. The suspension arm is connected to the steer axle assembly at a location outboard of the longitudinal frame rails of the vehicle and extends longitudinally at an angle to the frame rails. The suspension arm arrangement can be used with a variety of suspensions including leaf spring and multi-link suspensions.

13 Claims, 4 Drawing Sheets

U.S. PATENT DOCUMENTS

| | | | |
|---|---|---|---|
| 6,375,203 | B1 | 4/2002 | Warinner et al. |
| 6,406,007 | B1 | 6/2002 | Wilson |
| 6,425,593 | B2 | 7/2002 | Fabris et al. |
| 6,866,277 | B2 | 3/2005 | Ziech et al. |
| 6,997,468 | B2 | 2/2006 | Ziech et al. |
| 7,048,286 | B2 * | 5/2006 | Eppelein .............. 280/124.106 |
| 2003/0234529 | A1 * | 12/2003 | Ziech et al. ................ 280/787 |
| 2006/0001311 | A1 | 1/2006 | Platner et al. |

FOREIGN PATENT DOCUMENTS

JP     10-181322     7/1998

OTHER PUBLICATIONS

Holen, Peter et al., "Aspects on Roll and Bounce Damping for Heavy Vehicles," SAE Technical Paper Series 2002-01-3060 (2002).

"Airtek Integrated Front Air Suspension and Steer Axle Technology," The Boler Company, 4 pages (copyright 2002).

"All Part of the Whole", MAN Nutzfahrzeuge Aktiengeseelschaft, pp. 4-7, 10-14, 17-18, 27 and front and rear cover pages (est. 2002).

"Neway AS-Series R.V./Bus Air Steer Suspension," Neway Anchorlok Intl., 2 pages (copyright 1997).

* cited by examiner

BEAM AXLE SUSPENSION WITH DIAGONAL LINK

BACKGROUND OF THE INVENTION

1. Field of the Invention

This invention relates to vehicle suspensions and, in particular, to a steer axle and suspension assembly incorporating a diagonal suspension arm or link between the frame and steer axle assembly to provide lateral stability.

2. Discussion of Related Art

One conventional type of steer axle assembly includes an axle beam that extends across the vehicle transverse to parallel longitudinally extending frame rails of the vehicle frame and which supports ground engaging wheels on either side of the vehicle. The axle beam is suspended from the vehicle frame by one or more suspension members including suspension arms, springs and shock absorbers. The suspension must provide lateral stability to the axle beam to prevent undesirable lateral movement of the axle beam. One conventional suspension includes a track rod or panhard rod that extends transverse to the vehicle frame. The use of a panhard rod in a steer axle assembly is difficult from a packaging standpoint, however, given the engine and other components that are typically located proximate the steer axle assembly. Another suspension incorporates one or more leaf springs between the frame and axle beam. Flexing of the leaf springs provides roll stiffness, but the axle beam is subject to torsional deflection. Typical leaf spring suspensions also fail to adequately react brake torque.

The inventors herein have recognized a need for a steer axle and suspension assembly that will minimize and/or eliminate one or more of the above-identified deficiencies.

SUMMARY OF THE INVENTION

The present invention provides a steer axle and suspension assembly for a vehicle having a frame including first and second longitudinal frame rails extending parallel to one another.

A steer axle and suspension assembly in accordance with the present invention includes a steer axle assembly that includes an axle beam defining a first bore at a first longitudinal end and a second bore at a second longitudinal end. The axle beam extends transverse to the first and second frame rails. The steer axle assembly further includes a first kingpin disposed within the first bore in the axle beam and a second kingpin disposed within the second bore in the axle beam. The steer axle assembly further includes a first steering knuckle rotatably supported on the first kingpin and a second steering knuckle rotatably supported on the second kingpin. The suspension of the inventive steer axle and suspension assembly includes a suspension member connected to the frame at a first end and to the steer axle assembly at a second end. The suspension also includes a suspension arm connected to the frame at a first end and to the steer axle assembly at a second end at a location outboard of the first and second frame rails. The suspension arm extends longitudinally at an angle relative to the first and second frame rails.

A steer axle and suspension assembly in accordance with the present invention offers significant advantages. The inventive assembly provides lateral stability to the axle beam without the use of a panhard rod. The inventive assembly also provides lateral stability without producing undue loads on the axle beam.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
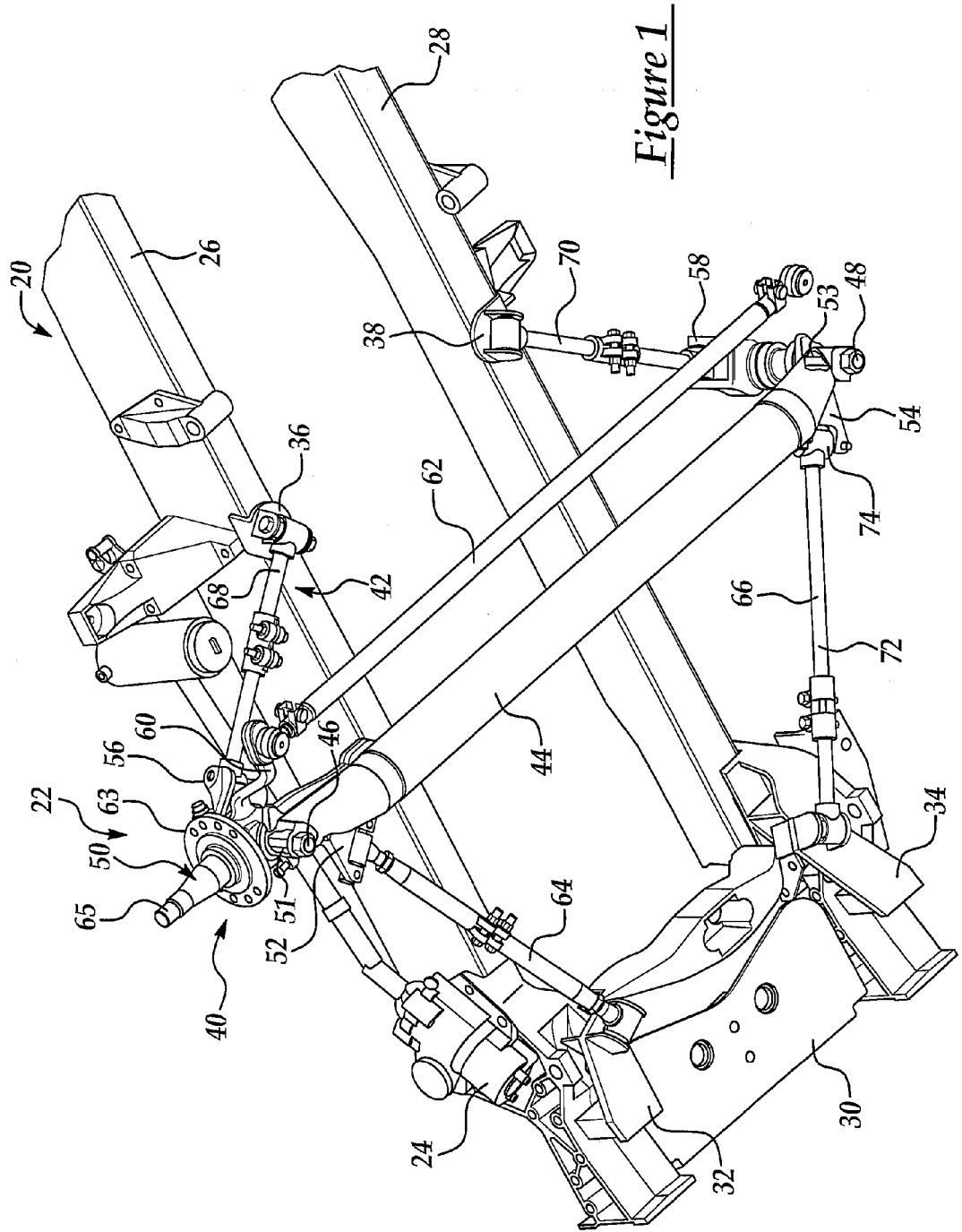
FIG. 1 is a perspective view of a portion of a vehicle incorporating a steer axle and suspension assembly in accordance with one embodiment of the present invention.

Referring now to the drawings wherein like reference numerals are used to identify identical components in the various views, FIG. 1 illustrates a vehicle frame 20 incorporating a steer axle and suspension assembly 22 in accordance with one embodiment of the present invention. In the illustrated embodiment, frame 20 and assembly 22 are adapted for use with a heavy truck. It should be understood, however, that the present invention may find application on a wide variety of vehicles.

Frame 20 is provided to support an engine (not shown), cab (not shown) and other components (such as steering gear 24) of a heavy truck. Frame 20 is conventional in the art and may be made from conventional metals and metal alloys such as steel. Frame 20 includes a pair of longitudinal rails 26, 28 extending in the direction of vehicle travel and in the longitudinal direction of the vehicle. Frame 20 may also include a plurality of cross-members, such as member 30, extending transversely between rails 26, 28 and a plurality of mounting brackets including brackets 32, 34, 36, 38.

Rails 26, 28 are provided to secure and align a cab on frame 20 and are conventional in the art. Rails 26, 28 are generally C-shaped in cross-section and are extend parallel and open toward one another. Rails 26, 28 may include a plurality of apertures configured to receive bolts, screws, or other fasteners used to secure cross cross-member 30, mounting brackets 32, 34, 36, 38 and other vehicle components.

Cross-member 30 connect rails 26, 28 and is conventional in the art. Cross-member 30 may also support various vehicle components including the cab and the vehicle engine.

Mounting brackets 32, 34, 36, 38 are provided to couple components of the vehicle including assembly 22 to frame 20 and are coupled to frame 20 using conventional fasteners such as screws, bolts, welds, or adhesives. It should be understood that the size, shape, and configuration of brackets 32, 34, 36, 38 will vary depending upon design requirements and parameters associated with frame 20 and assembly 22 and that variations may be made to brackets 32, 34, 36, 38 without departing from the scope of the present invention.

Assembly 22 includes a steer axle assembly 40 and a suspension 42. Assembly 40 is provided to support frame 20 on steerable, ground engaging wheels. Suspension 42 is provided to dampen movement between frame 20 and the assembly 40.

Steer axle assembly 40 support frame 20 on a plurality of steerable, ground engaging wheels (not shown). Assembly 40 may include an axle beam 44, kingpins 46, 48, and steering knuckles 50 disposed on either end of beam 44 (only one steering knuckle is shown in FIG. 1 for purposes of clarity).

Axle beam 44 supports frame 20 on ground engaging wheels (not shown) disposed proximate either end of beam 44. Beam 44 may be made from conventional metals and metal alloys such as steel and may be forged or fabricated. In the illustrated embodiment, beam 44 is substantially circular. It should be understood, however, that beam 44 could comprise a conventional I-beam and that the size and shape of beam 44 may generally vary. Beam 44 may also be solid or tubular. Beam 44 extends transverse to the longitudinal direction of the vehicle and to rails 26, 28. Each longitudinal end of beam 44 defines a bore 51, 53 that extends generally vertically and substantially perpendicular to the longitudinal axis of beam 44. Each bore is configured to receive a corresponding kingpin 46, 48. In the illustrated embodiment, beam includes a pair of mounting brackets 52, 54 coupled to beam 44 to support components of suspension 42 as described in greater detail hereinbelow.

Kingpins 46, 48 are provided to couple a corresponding knuckle 50 to beam. Kingpins 46, 48 may be made form steel or other conventional metals and metal alloys. Each kingpin 46, 48 may be fixed against rotation within a corresponding bore of axle beam 44 using one or more drawkeys as is conventional in the art. In the illustrated embodiment, each kingping 46, 48 includes a corresponding mounting bracket 56,58 to support components of suspension 42 as described in greater detail hereinbelow.

Knuckles 50 are conventional in the art and are provided for mounting one or more wheels (not shown) of the vehicle and for connecting assembly 22 to a vehicle steering assembly. Knuckles 50 may be made from conventional metals such as aluminum and metal alloys such as steel and may be forged or fabricated. Each knuckle 50 may include a body that defines one or more coaxial bores sized to receive a corresponding kingpin 46, 48 and bearings or a bushing (not shown) surrounding the kingpin 46, 48 to allow the knuckles 50 to rotate relative to the kingpins 46, 48. Each knuckle 50 may include a tie rod arm 60 for connection to a tie rod 62 and one knuckle 50 may further include a steering arm as is conventional in the art for connection to the vehicle steering assembly. Each knuckle 50 may also include a brake mounting plate 63 and a spindle 65 (which may be integral with the knuckle body or coupled thereto) on which wheel bearings (not shown) and one or more wheels (not shown) are mounted.

Suspension 42 is provided to dampen movement between frame 20 and steer axle assembly 40. In accordance with the present invention, multiple steer axle and suspension assemblies 22 will be described and illustrated incorporating a variety of suspensions 42. Each suspension is configured to provide lateral stability to axle beam 44 without the use of a panhard rod and without producing undue loads on beam 44. Each suspension, including suspension 42, includes a suspension arm or link connected to frame 20 at one end and to steer axle assembly 40 at another end. The arm is connected to assembly 40 at a location outboard of rails 26, 28 and extends longitudinally at an angle relative to rails 26, 28 and beam 40 (i.e., on a diagonal) relative to rails 26, 28 and beam 40). Each suspension, including suspension 42, also includes a suspension member connected to frame 20 at one end and to steer axle assembly 40 at another end. In the embodiment illustrated in FIG. 1 and other embodiments described hereinbelow, the suspension member comprises another suspension arm or link. In other embodiments described hereinbelow the suspension member may comprise a leaf spring. In FIG. 1, the suspension components on either side of the vehicle are illustrated. In other Figures, the suspension components on only one side of the vehicle are illustrated. It should be understood in these instances, however, that similar suspension components may be located on the opposite side of the vehicle.

Referring again to FIG. 1, suspension 42 includes a pair of suspension arms or links 64, 66 and a pair of suspension members 68, 70 which comprise another pair of suspension arms or links in the illustrated embodiment. The structure of arms 64, 66, 68, 70 is conventional in the art. In particular, each arm 64, 66, 68, 70 may include a solid or tubular member 72 having a bushing 74 or mounting bracket (not shown) at either longitudinal end to allow the arm 64, 66, 68, 70 to either be mounted for rotation relative to frame 20 or assembly 40 or fixed against movement relative to frame 20 or assembly 40. Arms 64, 66 are connected at inboard ends to frame 20 through brackets 32, 34, respectively, and at outboard ends to beam 44 through brackets 52, 54. Arms 68, 70 are connected at inboard ends to frame through brackets 36, 38 and at outboard ends to kingpins 46, 48 through mounting brackets 56, 58. In this manner, arms 64, 66, 68, 70 form a Watt's linkage providing increased stability. Each of arms 64, 66, 68, 70 extends longitudinally at an angle relative to rails 26, 28 and beam 44. As a result, suspension 42 provides lateral stability to beam 44 and eliminates the need for a panhard rod.

Figure 2:
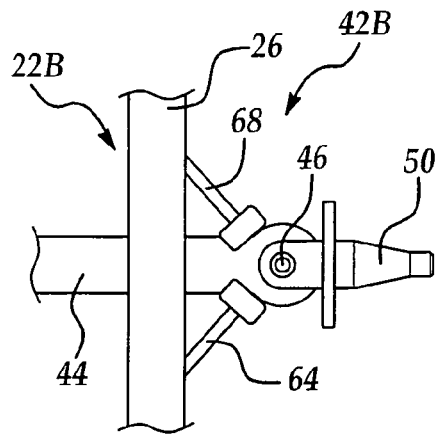
FIGS. 2–6 are diagrammatic views of steer axle and suspension assemblies in accordance with additional embodiments of the present invention.
Figure 3:
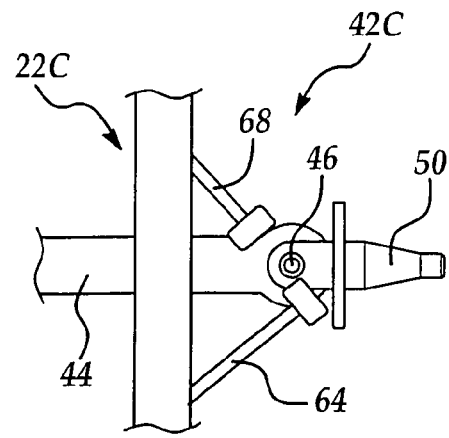
Figure 4:
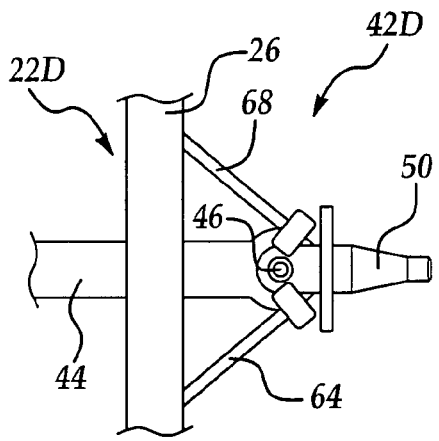
Figure 5:
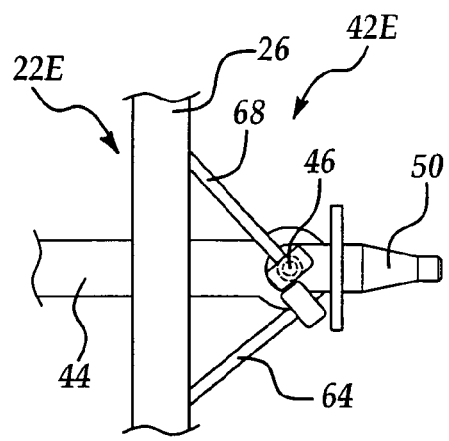
Figure 6:
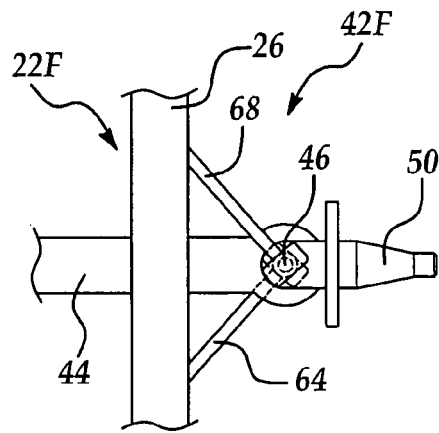

In the embodiment shown in FIG. 1, arms 64, 66 are connected at their outboard ends to beam 44 while arms 68, 70 are connected at their outboard ends to kingpins 46, 48. It should be understood that arms 64, 66, 68, 70 could be rearranged so that arms 68, 70 are coupled at their outboard ends to beam 44 while arms 64, 66 are connected at their outboard ends to kingpins 46, 48. Moreover, and with reference to FIGS. 2–6, arms 64, 66, 68, 70 could be connected at their outboard ends to various elements of steer axle assembly 40 thereby forming different embodiments of the present invention. Accordingly, FIG. 2 illustrates a steer axle and suspension assembly 22B including a suspension 42B in which the arms 64, 68 on either side of the vehicle are both connected at their outboard ends to beam 44. FIG. 3 illustrates a steer axle and suspension assembly 22C including a suspension 42C in which arm 68 is connected at its outboard end to beam 44 while arm 64 is connected at its outboard end to knuckle 50. FIG. 4 illustrates a steer axle and suspension assembly 22D including a suspension 42D in which arms 64, 68 are both connected at their outboard ends to knuckle 50. FIG. 5 illustrates a steer axle and suspension assembly 22E including a suspension 42E in which arm 64 is connected at its outboard end to knuckle 50 and arm 68 is connected at its outboard end to kingpin 46. Finally, FIG. 6 illustrates a steer axle and suspension assembly 22F including a suspension 42F in which arms 64, 68 are both connected at their outboard ends to kingpin 46 (with arm 64 connected to one end of kingpin and arm 68 connected to another end of kingpin. In each of the illustrated suspensions, arms 64, 68 extend longitudinally at an angle relative to rails 26, 28 and beam 44 to provide lateral stability to beam 44. Further, arms 64, 68 form a Watt's linkage in many of the embodiments for increased directional stability.

Figure 7:
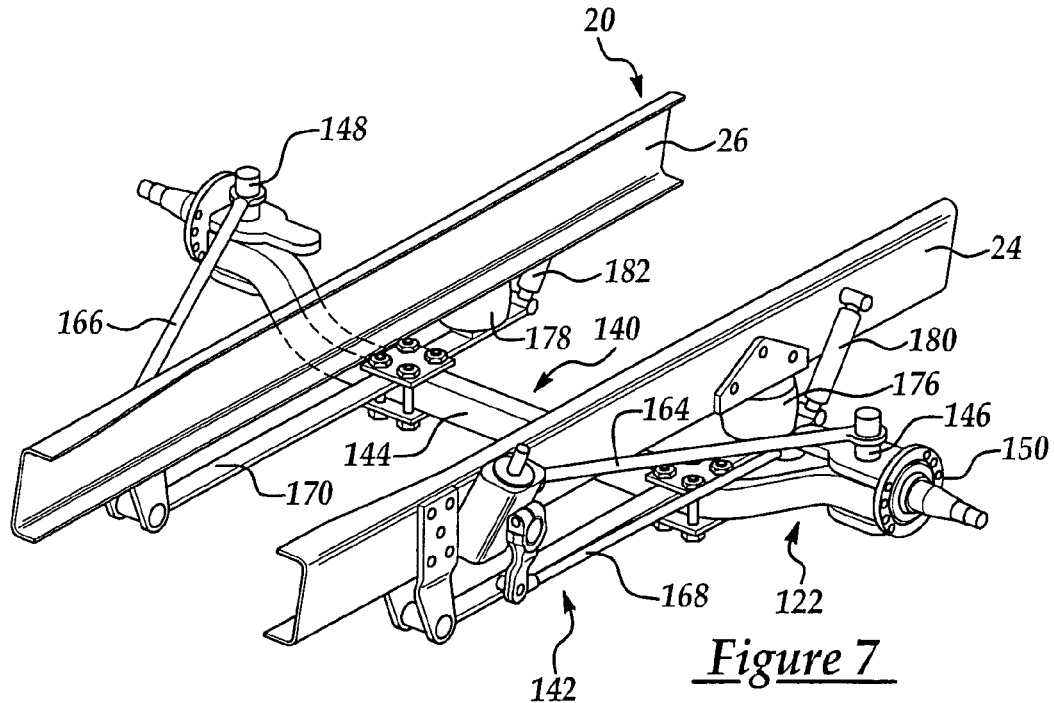
FIGS. 7–10 are perspective views of steer axle and suspension assemblies in accordance with additional embodiments of the present invention.

Referring now to FIG. 7, a steer axle and suspension assembly 122 in accordance with another embodiment of the present invention is shown. Assembly 122 includes a steer axle assembly 140 and a suspension 142. Assembly 140 is substantially similar to assembly 40 discussed hereinabove and includes an axle beam 144, kingpins 146, 148 and steering knuckles 150. Suspension 142 includes a pair of suspension arms or links 164, 166 and a pair of suspension members 168, 170 which comprise leaf springs.

Figure 8:
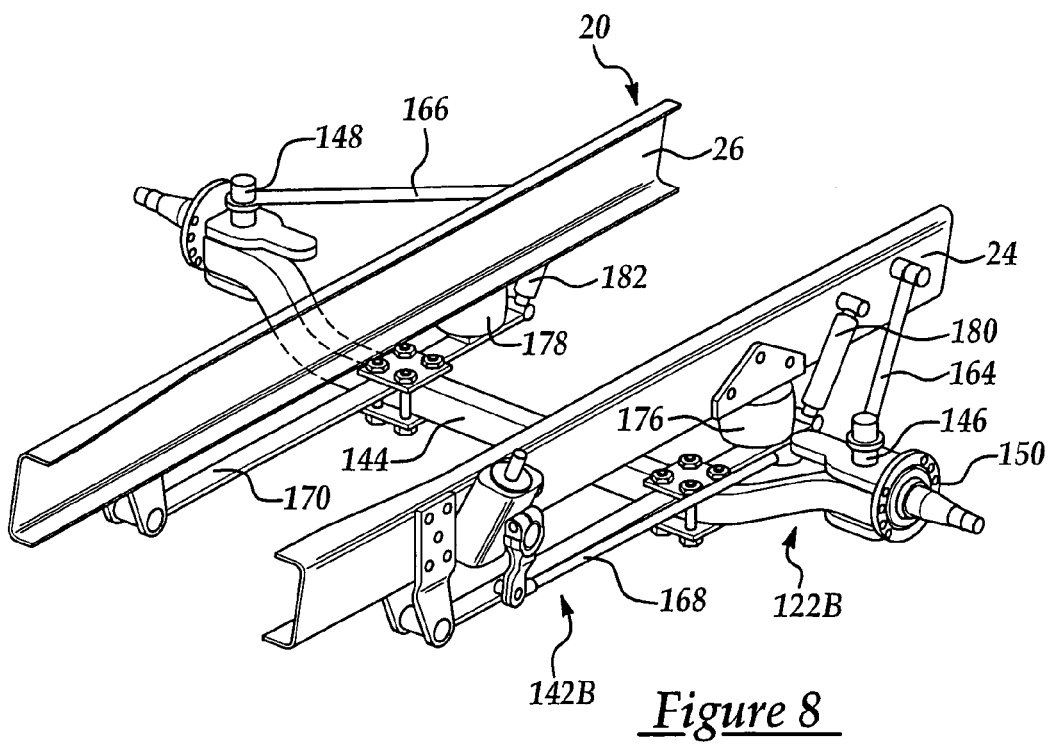

Arms 164, 166 are substantially similar to arms 64, 66 described hereinabove. Arms 164, 166 are coupled at their inboard ends to frame 20 using mounting brackets (not shown) and at their outboard ends to kingpins 146, 148 of steer axle assembly 140. Arms 164, 166 again extend longitudinally at an angle to rails 26, 28 and beam 144 to provide lateral stability to beam 144. It should be understood that arms 164, 166 may be connected to steer axle assembly 140 at a variety of locations including on beam 144 or knuckles 150 as discussed hereinbabove. In the embodiment illustrated in FIG. 7, arms 164, 166 extends between frame 20 and steer axle assembly 140 on a forward side of beam 144. Referring to FIG. 8, in an alternative embodiment of a steer axle and suspension assembly 122B in accordance with the present invention, a suspension 142B includes arms 164, 166 that extend between frame 20 and steer axle assembly 140 on a rearward side of beam 144.

Leaf springs 168, 170 are conventional in the art. Springs 168, 170 may be coupled at either end to frame 20 through mounting brackets and may be rigidly attached to beam 144 intermediate the ends using conventional brackets and fasteners. Alternatively, springs 168, 170 may be coupled at one end to frame 20 through mounting bracket and the other end may be coupled directly to beam 144. Additional suspension components such as air springs 176, 178 and shock absorbers 180, 182 may extend between springs 168, 170 and frame 20. In the illustrated embodiment, springs 168, 170 extend substantially parallel to rails 26, 28 and perpendicular to beam 144.

Figure 9:
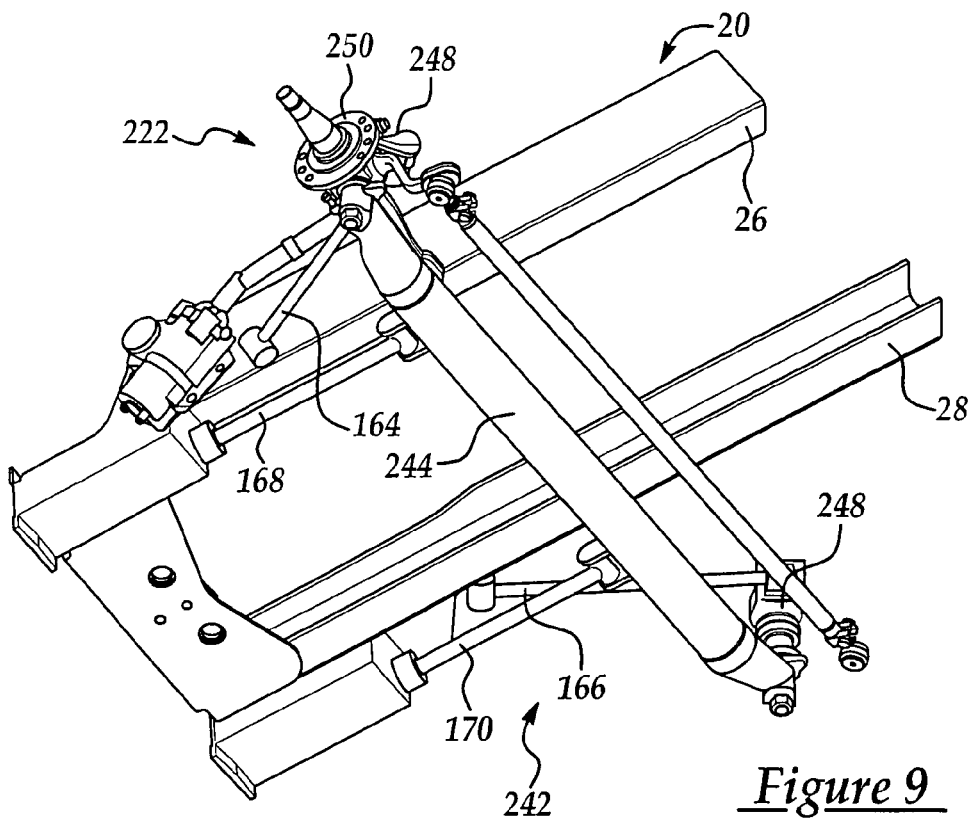

Referring now to FIG. 9, a steer axle and suspension assembly 222 in accordance with another embodiment of the present invention is shown. Assembly 222 includes a steer axle assembly 240 and a suspension 242. Assembly 240 is substantially similar to assembly 40 discussed hereinabove and includes an axle beam 244, kingpins 246, 248 and steering knuckles 250. Suspension 242 includes a pair of suspension arms or links 264, 266 and a pair of suspension members 268, 270 which comprise another pair of suspension arms or links in the illustrated embodiment.

Figure 10:
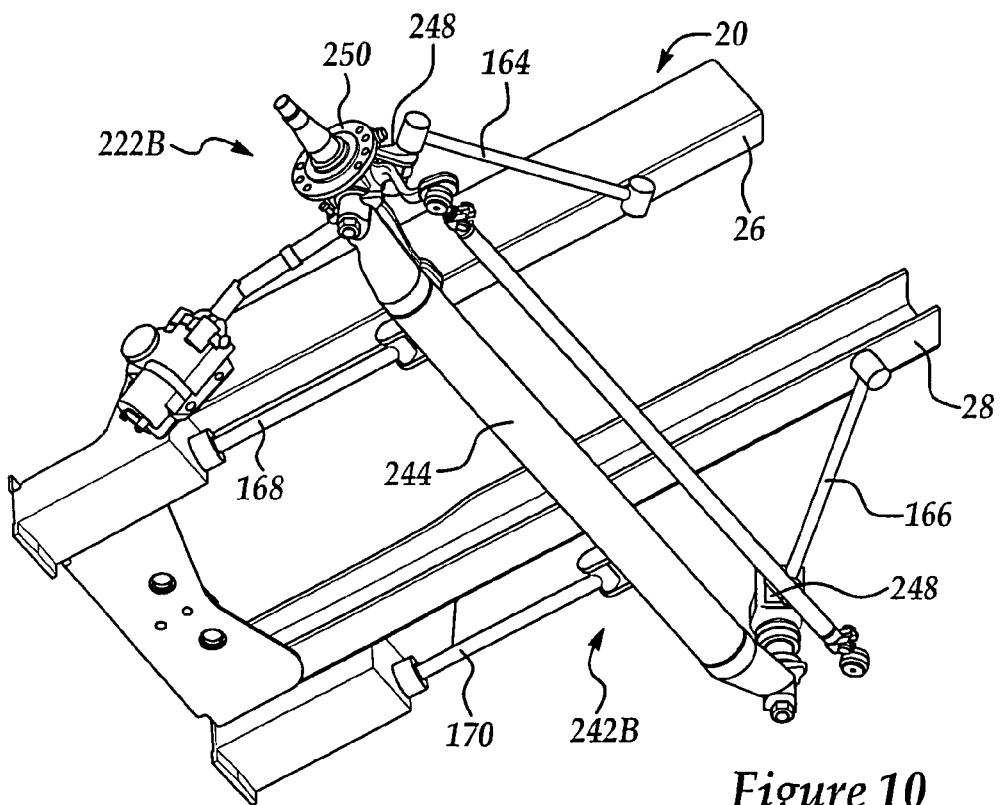

Arms 264, 266, 268, 270 are substantially similar in construction to arms 64, 66, 68, 70 described hereinabove. Arms 264, 266 are coupled at one end to frame and at their other ends to beam 244. Arms extend substantially parallel to rails 24, 26 and perpendicular to beam. Arms 264, 266 are coupled at their inboard ends to frame 20 using mounting brackets (not shown) and at their outboard ends to kingpins 246, 248 of steer axle assembly 240. Arms 264, 266 again extend longitudinally at an angle to rails 26, 28 and beam 244 to provide lateral stability to beam 244. It should be understood that arms 264, 266 may be connected to steer axle assembly 240 at a variety of locations including on beam 244 or knuckles 250 as discussed hereinbabove. In the embodiment illustrated in FIG. 9, arms 264, 266 extends between frame 20 and steer axle assembly 240 on a forward side of beam 244. Referring to FIG. 10, in an alternative embodiment of a steer axle and suspension assembly 222B in accordance with the present invention, a suspension 242B includes arms 264, 266 that extend between frame 20 and steer axle assembly 240 on a rearward side of beam 244. It should also be understood that each of arms 264, 266, 268, 270 could be disposed on a rearward side of beam 244 (similar to FIG. 9) or that arms 264, 266 could be located on a forward side of beam 244 while arms 268, 270 are located on a rearward side of beam 244 (similar to FIG. 10). Arms 268, 270 are coupled at one end to frame 20 through mounting brackets (not shown) and at a second end to beam 244. Arms 268, 270 extend substantially parallel to rails 26, 28 and perpendicular to beam 244.

A steer axle and suspension assembly in accordance with the present invention is advantageous. In particular, the inventive assembly provides lateral stability to the axle beam. In this manner, the inventive assembly eliminates the need for a panhard rod and also reduces torsional loads on the beam resulting from some conventional suspensions.

While the invention has been shown and described with reference to one or more particular embodiments thereof, it will be understood by those of skill in the art that various changes and modifications can be made without departing from the spirit and scope of the invention.

We claim:

1. A steer axle and suspension assembly for a vehicle having a frame including first and second longitudinal frame rails extending parallel to one another, said assembly comprising:
   a steer axle assembly including
      an axle beam defining a first bore at a first longitudinal end and a second bore at a second longitudinal end, said axle beam extending transverse to said first and second frame rails;
      a first kingpin disposed within said first bore in said axle beam;
      a second kingpin disposed within said second bore in said axle beam;
      a first steering knuckle rotatably supported on said first kingpin; and,
      a second steering knuckle rotatably supported on said second kingpin; and,
   a suspension including
      a suspension member connected to said frame at a first end and to said steer axle assembly at a second end; and,
      a first suspension arm connected to said frame at a first end and to said steer axle assembly at a second end at a location outboard of said first and second frame rails, said first suspension arm extending longitudinally at an angle relative to said first and second frame rails
   wherein said second end of said first suspension arm is mounted on said axle beam.

2. The steer axle and suspension assembly of claim 1 wherein said suspension member comprises a second suspension arm.

3. The steer axle and suspension assembly of claim 1 wherein said second end of said suspension member is connected to said steer axle assembly at a location outboard of said first and second frame rails said suspension member extending longitudinally at an angle relative to said first and second frame rails.

4. The steer axle and suspension assembly of claim 3 wherein one of said suspension member and said first suspension arm is connected to said frame forward of said axle beam and another of said suspension member and said first suspension arm is connected to said frame rearward of said axle beam.

5. The steer axle and suspension assembly of claim 3 wherein said second end of said suspension member and said second end of said first suspension arm are both mounted on said axle beam.

6. A steer axle and suspension assembly for a vehicle having a frame including first and second longitudinal frame rails extending parallel to one another, said assembly comprising:
- a steer axle assembly including
  - an axle beam defining a first bore at a first longitudinal end and a second bore at a second longitudinal end, said axle beam extending transverse to said first and second frame rails;
  - a first kingpin disposed within said first bore in said axle beam;
  - a second kingpin disposed within said second bore in said axle beam;
  - a first steering knuckle rotatably supported on said first kingpin; and,
  - a second steering knuckle rotatably supported on said second kingpin; and,
- a suspension including
  - a suspension member connected to said frame at a first end and to said steer axle assembly at a second end; and,
  - a first suspension arm connected to said frame at a first end and to said steer axle assembly at a second end at a location outboard of said first and second frame rails, said first suspension arm extending longitudinally at an angle relative to said first and second frame rails
- wherein said second end of said first suspension arm is mounted on said first steering knuckle.

7. The steer axle and suspension assembly of claim 6 wherein said suspension member comprises a second suspension arm.

8. The steer axle and suspension assembly of claim 6 wherein said second end of said suspension member is connected to said steer axle assembly at a location outboard of said first and second frame rails, said suspension member extending longitudinally at an angle relative to said first and second frame rails.

9. The steer axle and suspension assembly of claim 8 wherein one of said suspension member and said first suspension arm is connected to said frame forward of said axle beam and another of said suspension member and said first suspension arm is connected to said frame rearward of said axle beam.

10. The steer axle and suspension assembly of claim 8 wherein said second end of said suspension member and said second end of said first suspension arm are both mounted on said first steering knuckle.

11. A steer axle and suspension assembly for a vehicle having a frame including first and second longitudinal frame rails extending parallel to one another, said assembly comprising:
- a steer axle assembly including
  - an axle beam defining a first bore at a first longitudinal end and a second bore at a second longitudinal end, said axle beam extending transverse to said first and second frame rails;
  - a first kingpin disposed within said first bore in said axle beam;
  - a second kingpin disposed within said second bore in said axle beam;
  - a first steering knuckle rotatably supported on said first kingpin; and,
  - a second steering knuckle rotatably supported on said second kingpin; and,
- a suspension including
  - a suspension member connected to said frame at a first end and to said steer axle assembly at a second end; and,
  - a first suspension arm connected to said frame at a first end and to said steer axle assembly at a second end at a location outboard of said first and second frame rails, said first suspension arm extending longitudinally at an angle relative to said first and second frame rails
- wherein said second end of said suspension member is connected to said steer axle assembly at a location outboard of said first and second frame rails, said suspension member extending longitudinally at an angle relative to said first and second frame rails and
- wherein one of said second end of said suspension member and said second end of said first suspension arm is mounted to one of said axle beam, said first kingpin and said first steering knuckle and another of said second end of said suspension member and said second end of said first suspension arm is mounted to another of said axle beam, said first kingpin and said first steering knuckle.

12. The steer axle and suspension assembly of claim 11 wherein said suspension member comprises a second suspension arm.

13. The steer axle and suspension assembly of claim 11 wherein one of said suspension member and said first suspension arm is connected to said frame forward of said axle beam and another of said suspension member and said first suspension arm is connected to said frame rearward of said axle beam.

* * * * *